Patented July 10, 1934

1,966,302

UNITED STATES PATENT OFFICE 1,966,302

RECLAMATION OF MIXED ORGANIC ACID ESTERS OF CELLULOSE

Carl J. Malm and Webster E. Fisher, Rochester, N. Y., assignors to Eastman Kodak Company, Rochester, N. Y., a corporation of New York No Drawing. Application September 29, 1933, Serial No. 691,571

9 Claims. (Cl. 260—102)

The present invention relates to the separation of hydrolyzed cellulose acetate and fully esterified cellulose acetate propionate (or acetate butyrate) when these compounds are associated with each other such as in the case of some kinds of film scrap.

Fully esterified cellulose acetate propionate as well as the ordinary hydrolyzed cellulose acetate may be employed in the building up of sheeting or film, which may be employed as the base for photographic film, for wrapping purposes or the like or in the manufacture of yarn. In the recovery of the scrap from these uses the problem arises of separating the two esters mentioned above. It might seem that the mixture of these two esters might be employed for reuse without separation; however due to the incompatability of the two esters, the solutions containing both are grainy, and sheets coated therefrom are hazy, grainy and brittle.

One object of our invention is to provide a method of reclaiming scrap containing both cellulose acetate and fully esterified cellulose acetate propionate (or acetate butyrate). Another object of our invention is to provide a process in which the separation of the constituents of the scrap and the preparation of skins of the fully esterified cellulose acetate propionate may be both performed without the necessity of redissolving that ester.

We have found that if scrap or material containing a mixture of cellulose acetate and fully esterified cellulose acetate propionate (or acetate-butyrate) is treated with a solvent mixture consisting of 50-80% of ethylene chloride and 20-50% of propylene chloride the fully esterified cellulose acetate propionate (or acetate-butyrate) is dissolved while the cellulose acetate remains undissolved. The percentage of propylene chloride which may be employed depends upon the propionyl content of the acetate propionate, as the esters having a higher propionyl content will tolerate larger quantities of propylene chloride. Use may be made of this fact where the scrap contains a plurality of cellulose acetate propionates having differing propionyl contents in that the higher propionyl content esters may be dissolved out by employing a solvent mixture having a relatively high percentage of propylene chloride.

It is advantageous in carrying out a separation in accordance with the present invention to maintain the highest proportion of propylene chloride possible which will effect a separation of the cellulose acetate and the cellulose acetate propionate as the separation of the cellulose acetate is facilitated by employing a high percentage of propylene chloride. The greater the content of propylene chloride the better is the physical form of the remaining cellulose acetate for filtering. In cases where it is necessary that not more than a small proportion of propylene chloride be used the cellulose acetate is softened, which makes filtering difficult. In that case some other means of separation of the cellulose acetate from the solution of the mixed ester, such as by decantation, is desirable.

As a general rule when the cellulose acetate propionate (or acetate butyrate) to be dissolved out from the scrap contains approximately 12% of propionyl or butyryl only approximately 20% of the solvent mixture may be propylene chloride. When the acetate pripionate or acetate butyrate contains approximately 20% of propionyl or butyryl, approximately 50% of the solvent mixture may be propylene chloride. When the mixed ester contains more than 20% of propionyl or butyryl, a greater percentage than 50% of the propylene chloride may be employed in the solvent mixture.

The following examples illustrate processes embodying our invention:

Example I 10 lbs. of scrap photographic film containing both cellulose acetate film and cellulose acetate propionate film, the latter having a propionyl content of about 14% are stirred into 50 lbs. of a solvent mixture consisting of approximately 80% of ethylene chloride and 20% of propylene chloride. After allowing sufficient time for solution to occur the liquid may be separated from the remaining cellulose acetate by screening, centrifuging or filtering or if desired by decantation. The solution may be employed for the preparation of colloidized products such as sheeting or if the ester per se is desired it may be precipitated out by pouring the solution into a non-solvent therefor such as petroleum ether or into boiling water.

Example II 10 lbs. of scrap photographic film in which is included both film of cellulose acetate and of fully esterified cellulose acetate propionate the latter having a propionyl content of approximately 20% propionyl are stirred into 50 lbs. of a solvent mixture consisting of equal parts of ethylene chloride and propylene chloride until the acetate propionate film is dissolved. The cellulose acetate propionate solution may be separated from the cellulose acetate and employed as desired as described in the preceding example.

Example III 10 lbs. of scrap photographic film in which is included film of cellulose acetate, of fully esterified cellulose acetate propionate having a propionyl content of 12% and of fully esterified cellulose acetate propionate having a propionyl content of 30% are treated with 50 lbs. of a solvent mixture consisting of 70% propylene chloride and 30% ethylene chloride until the film having the higher propionyl content is dissolved. This solution may be filtered off from the remaining scrap which is then treated with 30 lbs. of a solvent mixture consisting of 15% propylene chloride and 85% ethylene chloride to dissolve the remaining cellulose acetate propionate. This may be separated from the remaining undissolved cellulose acetate as disclosed in the preceding examples.

*Example IV*

10 lbs. of scrap photographic film in which is included film both of cellulose acetate and of fully esterified cellulose acetate butyrate having a butyryl content of approximately 25% are treated with a solvent mixture of 60% propylene chloride and 40% ethylene chloride until the acetate butyrate film is entirely dissolved. The solution may then be separated from the remaining cellulose acetate film as desired. If cellulose propionate butyrate is present that ester may be removed with propylene chloride alone although if desired some ethylene chloride might be mixed therewith.

Although all the examples are directed to the reclamation of film scrap as this is the most common cellulose ester material which presents the problem of recovery after use, any other scrap material of a similar composition permits of reclamation by the present invention.

If any such material contains cellulose acetate propionate butyrate, that ester may be separated out following the same procedure as with the acetate propionate or acetate butyrate except that the proportions of the solvent mixture to be employed will be determined by the total percentage of propionyl and butyryl in the ester.

In some cases it may be desirable to heat the mass to hasten solution of the ester; however, except in the case of the mixtures containing a high proportion of propylene chloride this heating will interfere to some extent with the ease of separation of the cellulose acetate from the solution.

We claim as our invention:

1. A process for reclaiming cellulose acetate and at least one fully esterified mixed ester of cellulose containing only acyl groups of 2–4 carbon atoms and at least 12% of acyl of 3–4 carbon atoms from a mass in which they are associated which comprises treating the mass with a solvent for at least one mixed ester which is present containing 20%–100% of propylene chloride, the remainder essentially consisting of ethylene chloride until at least one mixed ester is substantially dissolved and then separating the undissolved portion of the mass from the solution of that mixed ester.

2. A process for reclaiming cellulose acetate and a fully esterified mixed ester of cellulose containing only acyl groups of 2–4 carbon atoms and at least 12% of acyl of 3–4 carbon atoms from a mass in which they are associated which comprises treating the mass with a solvent for the mixed ester containing 20%–100% of propylene chloride, the remainder essentially consisting of ethylene chloride until the mixed ester is substantially dissolved and then separating the undissolved cellulose acetate from the solution of the mixed ester.

3. A process for reclaiming cellulose acetate and a fully esterified mixed ester of cellulose containing only acyl groups of 2–4 carbon atoms in which the acyl of 3–4 carbon atoms is at least 20% from a mass in which these esters are associated which comprises treating the mass with a solvent for the mixed ester containing 50%–100% of propylene chloride, the remainder essentially consisting of ethylene chloride, until the mixed ester is substantially dissolved and then separating the undissolved cellulose acetate from the solution of the mixed ester.

4. A process for reclaiming cellulose acetate and a plurality of fully esterified mixed esters of cellulose containing only acyl groups of 2–4 carbon atoms from a mass in which they are associated which comprises treating the mass with a propylene chloride-ethylene chloride mixture, which is a solvent for the mixed ester having the greater content of acyl of 3–4 carbon atoms which is at least 12% but which is a non-solvent for the other mixed esters present, until that ester is substantially dissolved and then separating the undissolved portion therefrom.

5. A process for reclaiming cellulose acetate and a fully esterified cellulose acetate propionate which contains at least 12% propionyl which comprises treating the mass with a solvent for the mixed ester containing 20%–100% of propylene chloride, the remainder essentially consisting of ethylene chloride, until the cellulose acetate propionate is substantially dissolved and then separating the undissolved cellulose acetate from the solution of the mixed ester.

6. A process for reclaiming cellulose acetate and a fully esterified cellulose acetate propionate which contains at least 20% propionyl which comprises treating the mass with a solvent for the mixed ester containing 50%–100% of propylene chloride, the remainder essentially consisting of ethylene chloride, until the cellulose acetate propionate is substantially dissolved and then separating the undissolved cellulose acetate from the solution of the mixed ester.

7. A process for reclaiming cellulose acetate and a fully esterified cellulose acetate butyrate which contains at least 12% butyryl which comprises treating the mass with a solvent for the mixed ester containing 20%–100% of propylene chloride, the remainder essentially consisting of ethylene chloride, until the cellulose acetate butyrate is substantially dissolved and then separating the undissolved cellulose acetate from the solution of the mixed ester.

8. A process for reclaiming cellulose acetate and a fully esterified cellulose acetate butyrate which contains at least 20% butyryl which comprises treating the mass with a solvent for the mixed ester containing 50%–100% of propylene chloride, the remainder essentially consisting of ethylene chloride, until the cellulose acetate butyrate is substantially dissolved and then separating the undissolved cellulose acetate from the solution of the mixed ester.

9. A process for reclaiming cellulose acetate and a fully esterified cellulose acetate propionate butyrate which contains at least 12% of propionyl and butyryl which comprises treating the mass with a solvent for the mixed ester containing 20%–100% of propylene chloride, the remainder essentially consisting of ethylene chloride, until the cellulose acetate propionate butyrate is substantially dissolved and then separating the undissolved cellulose acetate from the solution of the mixed ester.

CARL J. MALM.
WEBSTER E. FISHER.